Feb. 6, 1923. 1,444,061
H. J. BUTLER.
PRESERVING UNCURED RUBBER.
FILED APR. 9, 1919.
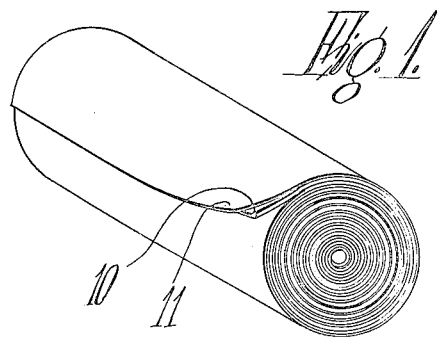
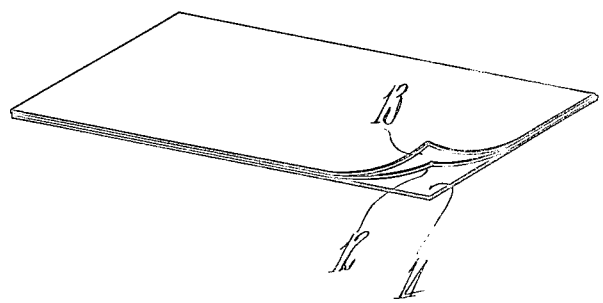
INVENTOR
Harry J. Butler
BY Chapin & Neal
ATTORNEYS Patented Feb. 6, 1923.

1,444,061

UNITED STATES PATENT OFFICE.

HARRY J. BUTLER, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

PRESERVING UNCURED RUBBER.

Application filed April 9, 1919. Serial No. 288,852.

*To all whom it may concern:*

Be it known that I, HARRY J. BUTLER, a citizen of the United States of America, residing at Springfield, in the county of Hampden and the State of Massachusetts, have invented certain new and useful Improvements in Preserving Uncured Rubber, of which the following is a specification.

My invention relates to improvements in preserving uncured rubber, and specifically to a package for enclosing sheet rubber which is adapted to be used in making vulcanized patches on tire casings and tubes.

It has for its object the provision of a package which will preserve the rubber, prevent its deterioration, and permit its ready handling. It has for a further object a provision of a package which will accomplish these results at less expense than packages formerly produced.

In shipping uncured rubber stock to customers who use it in making vulcanized patches, or in storing the rubber, it has been customary to enclose the rubber between layers of holland or glazed shade cloth. This may be done either by rolling up the rubber and holland together or by laying a sheet of rubber on a sheet of holland and preferably laying a second sheet of holland over the rubber. The holland is expensive, and, as the packages are usually shipped to automobile owners, who buy small quantities and who throw away the material, the expense is an irrecoverable loss. It is extremely desirable to find a less expensive substitute for the holland.

I have found that a parchmentized paper serves to prevent the rubber from drying out and effectively preserves the stock when substituted for the holland. Preferably, this parchmentized paper has incorporated therein a small amount of glycerin or other softening agent, such as glucose, calcium chloride, Turkey-red oil, etc., which both prevents the paper from becoming brittle and more thoroughly closes the pores of the paper, thereby keeping the uncured rubber fresh and in condition for a longer period. The glycerine may be added to the paper by immersing the latter, after it has been parchmentized, in a bath of glycerine. A process suitable for manufacturing such a paper is disclosed in the patent to Hudson, 87,937, dated March 16, 1869.

Referring to the drawings.—

Fig. 1 is a perspective view of a roll of rubber and paper made according to my invention; and Fig. 2 is a perspective view of a flat package embodying my invention.

In Fig. 1, the sheet of uncured rubber 10 is wound up into roll form together with a sheet of parchmentized paper 11. This results in the rubber being effectively enclosed by the paper, and rubber packed in this form will be preserved in condition for use over a long period of time. When it is desired to use the rubber, a portion of the compound strip formed by the rubber and paper is unrolled and severed from the roll, and the paper stripped from the rubber. The paper is comparatively inexpensive and can be thrown away with but little loss.

In Fig. 2 is shown a package which is suitable for use when smaller sheets of rubber are to be preserved. In this instance, a sheet of rubber 12 is enclosed between sheets of parchment paper 13 and 14. If the rubber is not to be preserved over a long period of time, but it is desired to have it in convenient form for handling, sheet 13 may be omitted.

The paper and rubber will adhere, but with insufficient firmness to interfere with the stripping of the rubber from the paper when it is desired to use a portion of the rubber.

My invention is equally applicable to the packaging of other substances than uncured rubber. For example, various forms of adhesives, surgical plasters, etc., may be preserved from exposure to the air by enclosing the adhesive or tacky substance forming the main element of the package by a parchmentized paper such as is described above.

What I claim is—

1. A package comprising a sheet of uncured rubber or the like mounted on a sheet of parchment paper.

2. A package comprising a sheet of uncured rubber or the like mounted on a sheet of parchment paper impregnated with a softening agent.

3. A package comprising a sheet of uncured rubber or the like mounted on a sheet of parchment paper impregnated with glycerin.

4. A roll comprising a sheet of uncured rubber or the like and a sheet of parchment paper wound together.

5. A roll comprising a sheet of uncured rubber or the like and a sheet of parchment paper impregnated with a softening agent wound together.

6. A roll comprising a sheet of uncured rubber or the like and a sheet of parchment paper impregnated with glycerin wound together.

7. The combination of a sheet of rubber with a separable protective covering therefor consisting of a sheet of relatively tough, pliable, air impervious, chemically parchmentized vegetable fiber.

8. As a new article of manufacture a laminated structure consisting of alternate layers of rubber and a separable covering of relatively tough, pliable, chemically parchmentized vegetable fiber, the latter adhering more strongly to one face of each layer of rubber than to the face of the second rubber layer with which it is engaged.

9. As a new article of manufacture a laminated structure consisting of alternate layers of rubber and a separable covering of relatively tough, pliable, glycerin-treated, chemically parchmentized vegetable fiber, the latter adhering more strongly to one face of each layer of rubber than to the face of the second rubber layer with which it is engaged.

HARRY J. BUTLER.